United States Patent
Morier et al.

(10) Patent No.: US 11,740,712 B1
(45) Date of Patent: Aug. 29, 2023

(54) INPUT DEVICE CONFIGURATION CLONING

(71) Applicant: Logitech Europe S.A., Lausanne (CH)

(72) Inventors: François Morier, Romanel-sur-Lausanne (CH); Junghyun Kim, Lausanne (CH); Andrew Coonrad, Newark, CA (US); Christine Flores, Seattle, WA (US); Chris Hughes, San Jose, CA (US); Florian Jeannerat, Morges (CH)

(73) Assignee: Logitech Europe S.A., Lausanne (CH)

( * ) Notice: Subject to any disclaimer, the term of this patent is extended or adjusted under 35 U.S.C. 154(b) by 0 days.

(21) Appl. No.: 17/733,115

(22) Filed: Apr. 29, 2022

(51) Int. Cl.
 *G06F 3/0354* (2013.01)
 *G06F 3/038* (2013.01)

(52) U.S. Cl.
 CPC .......... *G06F 3/03543* (2013.01); *G06F 3/038* (2013.01)

(58) Field of Classification Search
 CPC .............................. G06F 3/038; G06F 3/03543
 See application file for complete search history.

(56) References Cited

U.S. PATENT DOCUMENTS

| | | | |
|---|---|---|---|
| 9,910,512 B1* | 3/2018 | Tiwary | G06F 3/038 |
| 11,150,748 B1* | 10/2021 | Tan | G06F 3/0383 |
| 2003/0006961 A1* | 1/2003 | Shipilevsky | G06F 3/038 |
| | | | 345/157 |
| 2009/0089718 A1* | 4/2009 | Pompilio | G06F 9/453 |
| | | | 715/865 |
| 2011/0032539 A1* | 2/2011 | Chang | G06F 3/0317 |
| | | | 356/614 |
| 2013/0019127 A1* | 1/2013 | Chang | G06F 11/24 |
| | | | 714/E11.178 |
| 2016/0378201 A1* | 12/2016 | Baughman | G06F 8/38 |
| | | | 345/173 |

* cited by examiner

*Primary Examiner* — Ariel A Balaoing
(74) *Attorney, Agent, or Firm* — Kilpatrick Townsend & Stockton LLP

(57) ABSTRACT

A computer-implemented method includes receiving first and second movement data corresponding to a movement of a first and second computer mouse, respectively, wherein the first and second computer mice are oriented in a same direction are moving in unison over a same trajectory while the first and second movement data is contemporaneously received; determining a movement distance for the first and second computer mice based on the first and second movement data, respectively; determining a performance characteristic for the first computer mouse based on the determined first movement distance; determining the performance characteristic for the second computer mouse based on the determined second movement distance; determining a difference in the performance characteristic for the first computer mouse with respect to the second computer mouse; and calibrating the performance characteristic of the second computer mouse to match the performance characteristic of the first computer mouse.

20 Claims, 7 Drawing Sheets

INPUT DEVICE CONFIGURATION CLONING

BACKGROUND

Input devices are commonplace in modern society and are typically used to convert human-induced analog inputs (e.g., touches, clicks, motions, touch gestures, button presses, scroll wheel rotations, etc.) made in conjunction with an input device into digital signals for computer processing. An input device can include any device that can provide data and control signals to a computing system. Some non-limiting examples of input devices include computer mice, keyboards, virtual reality and/or augmented reality controllers, touch pads, remote controls, gaming controllers, joysticks, trackballs, and the like. Some non-limiting examples of computing systems include desktops, laptops, gaming consoles, tablets and "phablet" computers, smart phones, personal digital assistants, wearable devices (e.g., smart watches, glasses), virtual reality (VR) and/or augmented reality (AR) headsets and systems, and the like.

Computer mice have undergone significant improvements in functionality, accuracy, ergonomics, and versatility. Contemporary mice may include optical mice using optoelectronic sensors to compare successive images of an underlying surface on which the computer mouse operates to interpret movement. Technological improvements have allowed optical mice to functionally track over varied types of surfaces (e.g., tabletops, paper, glass, etc.), while avoiding some of the problems associated with mechanical mice. Optical mice typically employ light-emitting diodes (LEDs) and/or laser (e.g. coherent) light and an imaging array of photodiodes to detect movement relative to the underlying surface, which has proven to be much more reliant and robust as compared to their mechanical counterparts. Multi-surface use allows usage over a wider range of applications, which can be desirable by the average consumer.

Computer mice that often incorporate some of the most sophisticated tracking and feature-laden options are often gaming mice, which have some of the most discerning users. While there are many excellent options for computer mice with gaming grade specifications in the marketplace, even the best products may degrade over time due to wear-and-tear from normal long-term use, requiring the user to purchase a new mouse. A common complaint among garners is that they may spend hundreds if not thousands of hours using a particular mouse, acclimating to its particular and often unique performance characteristics via repetition and muscle memory, only to have to relearn and adapt to different performance characteristics when using a replacement mouse, even if it is the same model due to manufacturing tolerances that can cause slight but noticeable differences between otherwise identical looking products. A solution is needed to help bridge the acclimation gap between successive devices.

Unless otherwise indicated herein, the materials described in this section of the Specification are not prior art to the claims in this application and are not admitted to be prior art by inclusion in this section.

BRIEF SUMMARY

In certain embodiments, a computer-implemented method comprises: receiving first movement data corresponding to a movement of a first computer mouse along an underlying surface; receiving second movement data corresponding to a movement of a second computer mouse along the underlying surface, wherein the first computer mouse and the second computer mouse are oriented in a same direction and moving in unison over a substantially similar trajectory, and wherein the first movement data and the second movement data is received contemporaneously as the first computer mouse and the second computer mouse are moved in unison along the substantially similar trajectory; determining a first movement distance for the first computer mouse based on the first movement data; determining a second movement distance for the second computer mouse based on the second movement data; determining a performance characteristic for the first computer mouse based on the determined first movement distance; determining the performance characteristic for the second computer mouse based on the determined second movement distance; determining a difference in the performance characteristic for the first computer mouse with respect to the second computer mouse; and calibrating the performance characteristic of the second computer mouse to match the performance characteristic of the first computer mouse. In some implementations, the first computer mouse and the second computer mouse are in physical contact with each other while they are moved in unison along the substantially similar trajectory. The performance characteristics for the first computer mouse and second computer mouse can be a dots-per-inch (DPI) setting. The DPI setting in the second computer mouse can be matched to the DPI setting in the first computer mouse to within 1% or other suitable range (e.g., within 2%, 5%, etc.). The first movement data can be received from the first computer mouse, and the second movement data may be received from the second computer mouse. In some cases, the first movement data and the second movement data can be received from an operating system of a host computing device communicatively coupled to the first computer mouse and the second computer mouse. In certain embodiments, the substantially similar trajectory of the first computer mouse and the second computer mouse includes lifting the first computer mouse and the second computer mouse off of the underlying surface, and the performance characteristic for the first computer mouse and second computer mouse is a lift-off detection threshold. In further embodiments, the performance characteristic for the first computer mouse is a physical position of its corresponding optical sensor, and calibrating the performance characteristic of the second computer mouse to match the performance characteristic of the first computer mouse can include virtualizing a physical optical sensor position and operation of the second computer mouse to virtually match the physical position of the optical sensor of the first computer mouse.

In some embodiments, a system may comprise: one or more processors; one or more machine-readable, non-transitory storage mediums that include instructions configured to cause the one or more processors to perform operations including: receiving first movement data corresponding to a movement of a first computer mouse along an underlying surface; receiving second movement data corresponding to a movement of a second computer mouse along the underlying surface, wherein the first computer mouse and the second computer mouse are oriented in a same direction and moving in unison over a substantially similar trajectory, and wherein the first movement data and the second movement data is received contemporaneously as the first computer mouse and the second computer mouse are moved in unison along the substantially similar trajectory; determining a first movement distance for the first computer mouse based on the first movement data; determining a second movement distance for the second computer mouse based on the second movement data; determining a performance characteristic for the first computer mouse based on the determined first movement distance; determining the performance characteristic for the second computer mouse based on the determined second movement distance; determining a difference in the performance characteristic for the first computer mouse with respect to the second computer mouse; and calibrating the performance characteristic of the second computer mouse to match the performance characteristic of the first computer mouse. In some aspects, the first computer mouse and the second computer mouse are in physical contact with each other while they are moved in unison along the substantially similar trajectory. The performance characteristics for the first computer mouse and second computer mouse can include a dots-per-inch (DPI) setting, and the DPI setting in the second computer mouse is matched to the DPI setting in the first computer mouse to within 1% or other suitable range (e.g., within 2%, 5%, etc.). The first movement data may be received from the first computer mouse, and the second movement data can be received from the second computer mouse. In some cases, the first movement data and the second movement data are received from an operating system of a host computing device communicatively coupled to the first computer mouse and the second computer mouse. In certain cases, the substantially similar trajectory of the first computer mouse and the second computer mouse includes lifting the first computer mouse and the second computer mouse off of the underlying surface, and the performance characteristic for the first computer mouse and second computer mouse is a lift-off detection threshold. In certain embodiments, the performance characteristic for the first computer mouse is a physical position of its corresponding optical sensor, and calibrating the performance characteristic of the second computer mouse to match the performance characteristic of the first computer mouse includes virtualizing a physical optical sensor position and operation of the second computer mouse to virtually match the physical position of the optical sensor of the first computer mouse.

In further embodiments, a computer-readable storage medium having data stored therein representing software executable by one or more processors, the software including instructions operable to cause the one or more processors to perform operations including: receiving first movement data corresponding to a movement of a first computer mouse along an underlying surface; receiving second movement data corresponding to a movement of a second computer mouse along the underlying surface, wherein the first computer mouse and the second computer mouse are oriented in a same direction and moving in unison over a substantially similar trajectory, and wherein the first movement data and the second movement data is received contemporaneously as the first computer mouse and the second computer mouse are moved in unison along the substantially similar trajectory; determining a first movement distance for the first computer mouse based on the first movement data; determining a second movement distance for the second computer mouse based on the second movement data; determining a performance characteristic for the first computer mouse based on the determined first movement distance; determining the performance characteristic for the second computer mouse based on the determined second movement distance; determining a difference in the performance characteristic for the first computer mouse with respect to the second computer mouse; and calibrating the performance characteristic of the second computer mouse to match the performance characteristic of the first computer mouse. In some embodiments, the first computer mouse and the second computer mouse are in physical contact with each other while they are moved in unison along the substantially similar trajectory. In some cases, the performance characteristics for the first computer mouse and second computer mouse is a dots-per-inch (DPI) setting and the DPI setting in the second computer mouse is matched to the DPI setting in the first computer mouse to within 1% (or other suitable range, as described below). The first movement data can be received from the first computer mouse, and the second movement data can be received from the second computer mouse. In some embodiments, the first movement data and the second movement data are received from an operating system of a host computing device communicatively coupled to the first computer mouse and the second computer mouse. In some cases, the substantially similar trajectory of the first computer mouse and the second computer mouse includes lifting the first computer mouse and the second computer mouse off of the underlying surface, and the performance characteristic for the first computer mouse and second computer mouse is a lift-off detection threshold. In some embodiments, the performance characteristic for the first computer mouse is a physical position of its corresponding optical sensor, and calibrating the performance characteristic of the second computer mouse to match the performance characteristic of the first computer mouse includes virtualizing a physical optical sensor position and operation of the second computer mouse to virtually match the physical position of the optical sensor of the first computer mouse.

This summary is not intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim.

The foregoing, together with other features and examples, will be described in more detail below in the following specification, claims, and accompanying drawings.

The terms and expressions that have been employed are used as terms of description and not of limitation, and there is no intention in the use of such terms and expressions of excluding any equivalents of the features shown and described or portions thereof. It is recognized, however, that various modifications are possible within the scope of the systems and methods claimed. Thus, although the present system and methods have been specifically disclosed by examples and optional features, modification and variation of the concepts herein disclosed should be recognized by those skilled in the art, and that such modifications and variations are considered to be within the scope of the systems and methods as defined by the appended claims.

BRIEF DESCRIPTION OF THE DRAWINGS

The features of the various embodiments described above, as well as other features and advantages of certain embodiments of the present invention will be more apparent from the following detailed description taken in conjunction with the accompanying drawings, in which.

Throughout the drawings, it should be noted that like reference numbers are typically used to depict the same or similar elements, features, and structures.

DETAILED DESCRIPTION

Figure 1:
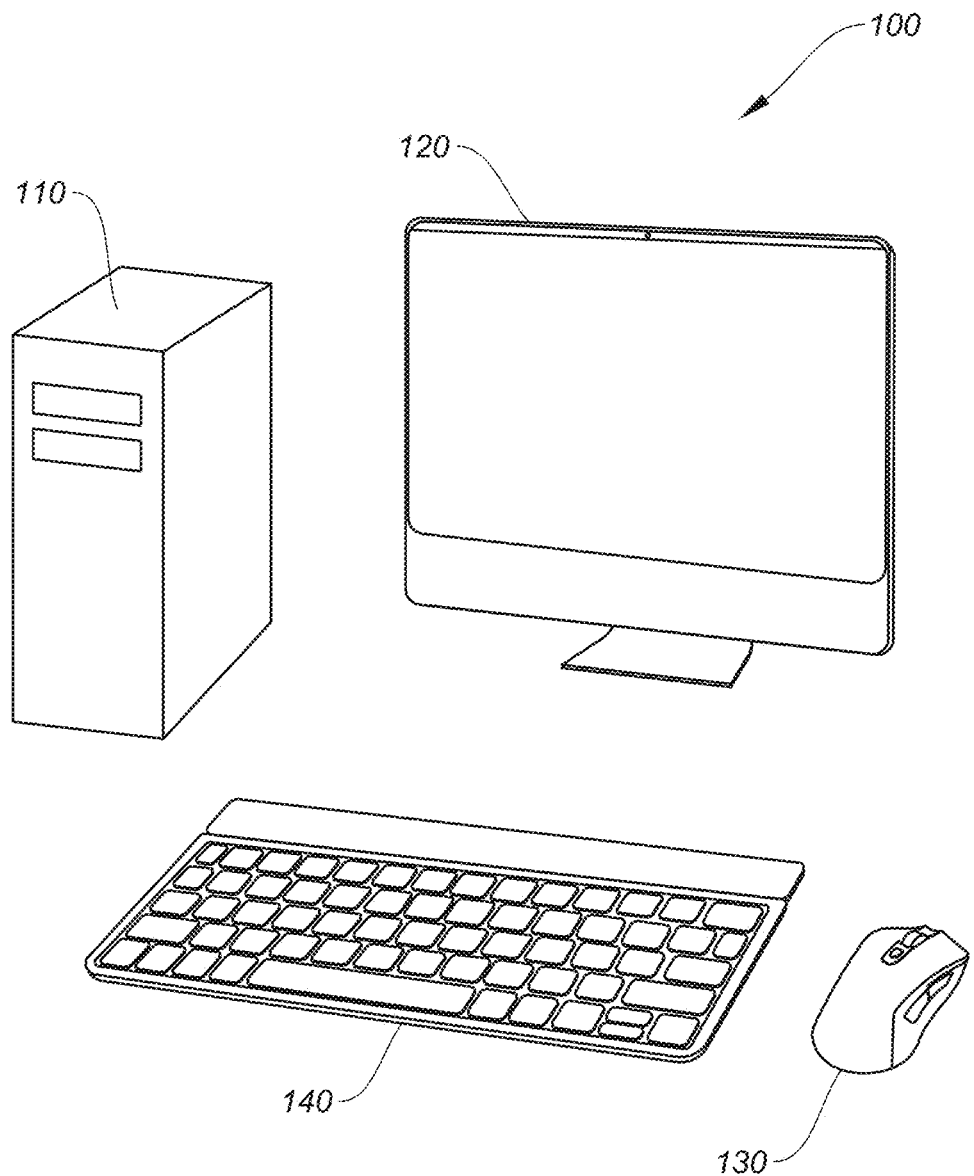
FIG. 1 shows a simplified diagram of a computer system, according to certain embodiments.

Aspects of the present disclosure relate generally to electronic devices, and more particularly to computer peripheral devices, according to certain embodiments.

In the following description, various examples of systems and methods for copying or "cloning" certain performance characteristics from one computer peripheral device to another computer peripheral device are described. For purposes of explanation, specific configurations and details are set forth to provide a thorough understanding of the embodiments. However, it will be apparent to one skilled in the art that certain embodiments may be practiced or implemented without every detail disclosed. Furthermore, well-known features may be omitted or simplified to help to prevent any obfuscation of the novel features described herein.

The following high-level summary is intended to provide a basic understanding of some of the novel innovations depicted in the figures and presented in the corresponding descriptions provided below. Aspects of the invention relate to copying or "cloning" certain performance characteristics from one computer peripheral device to another computer peripheral device. This may be desirable to a user that has acclimated to a particular computer peripheral device, such as a computer mouse, over many hundreds or thousands of hours. It is well known that E-sports professional gamers are especially attuned to their computer peripheral devices and even minute changes to their setup could substantially detriment their performance. Thus, replacing a worn out peripheral device can be a daunting matter, even when replacing a peripheral device with an identical model due to varying manufacturing tolerances and inconsistencies that occur from product to product that can cause slight but noticeable operational differences in performance between otherwise identical looking products.

Aspects of the invention solve this problem by essentially "cloning" certain performance characteristics from a first peripheral device and copying them to a second peripheral device, which can give the user a sense that the second peripheral device performs the same as the first, without the need to adapt to any new performance characteristics. Some performance characteristics that can be "cloned" can include a dots-per-inch (DPI) setting, a lift detection threshold setting, button operation settings including force profile characteristics, press button detection thresholds, and more. In some scenarios, a user may be used to a peripheral device with suboptimal settings for certain performance characteristics. In such cases, the system may change request permission to change certain performance characteristics immediately or over time in a stepwise fashion to acclimate the user to certain performance characteristics settings that may, for instance, allow the user to adapt to new settings that are known to be more conducive to higher performance outcomes.

By way of example, some embodiments of a computer-implemented method for cloning performance characteristics of a first computing device (e.g., a first computer mouse) on to a second computing device (e.g., a second computer mouse) can include receiving first movement data corresponding to a movement of a first peripheral device along an underlying surface; receiving second movement data corresponding to a movement of a second peripheral device along the underlying surface, wherein the first peripheral device and the second peripheral device are oriented in a same direction and moving in unison over a substantially similar trajectory, and wherein the first movement data and the second movement data is received contemporaneously as the first peripheral device and the second peripheral device are moved in unison along the substantially similar trajectory; determining a first movement distance for the first peripheral device based on the first movement data; determining a second movement distance for the second peripheral device based on the second movement data; determining a performance characteristic (e.g., DPI, lift detect threshold) for the first peripheral device based on the determined first movement distance; determining the performance characteristic for the second peripheral device based on the determined second movement distance; determining a difference in the performance characteristic for the first peripheral device with respect to the second peripheral device; and calibrating the performance characteristic of the second peripheral device to match the performance characteristic of the first peripheral device. Other examples, embodiments, modifications, etc., are possible and some are described in further detail below.

It is to be understood that this high-level summary is presented to provide the reader with a baseline understanding of some of the novel aspects of the present disclosure and a roadmap to the details that follow. This high-level summary in no way limits the scope of the various embodiments described throughout the detailed description and each of the figures referenced above are further described below in greater detail and in their proper scope.

FIG. 1 shows an example of a computer system 100 that can include any of a variety of host computing devices and computer peripheral devices, including peripheral devices (e.g., a computer mouse, keyboard, etc.) that can be configured to perform aspects of the various inventive concepts described herein. Computer system 100 shows a host computing device (shown as a desktop computer) 110 and some computer peripheral devices communicatively coupled to and operationally integrated with the host computing device, including a display device 120, a computer mouse 130, a keyboard 140, and may include any other suitable input device. Each computer peripheral device 120-140 can be communicatively coupled to host computing device 110.

Although the host computing device is shown as a desktop computer, other types of host computing devices can be used including gaming systems, laptop computers, set top boxes, entertainment systems, tablet or "phablet" computers, stand-alone head mounted displays ("HMD"), or any other suitable host computing device (e.g., smart phone, smart wearable, or the like). In some cases, multiple host computing devices may be used and one or more of the computer peripheral devices may be communicatively coupled to one or both of the host computing devices (e.g., a computer mouse may be coupled to multiple host computing devices). A host computing device may also be referred to herein as a "host computer," "host device," "computing device," "computer," or the like, and may include a machine readable medium (not shown) configured to store computer code, such as driver software, firmware, and the like, where the computer code may be executable by one or more processors of the host computing device(s) to control aspects of the host computing device, for instance via the one or more computer peripheral devices.

A typical computer peripheral device can include any suitable input device, output device or input/output device including those shown (e.g., a computer mouse) and not shown (e.g., remote control, wearables (e.g., gloves, watch, head mounted display), AR/VR controller, a CAD controller, joystick, simulation shifter, stylus device, or other suitable device) that can be used, for example, to convert analog inputs into digital signals for computer processing. By way of example, a computer peripheral device (e.g., computer mouse 130) can be configured to provide control signals for movement tracking (e.g., x-y movement on a planar surface, three-dimensional "in-air" movements, lift detection, etc.), touch and/or gesture detection, lift detection, orientation detection (e.g., in 3 degrees-of-freedom (DOF) system, 6 DOF systems, etc.), power management capabilities, input detection (e.g., buttons, scroll wheels, etc.), output functions (e.g., LED control, haptic feedback, etc.), or any of myriad other features that can be provided by a computer peripheral device, as would be appreciated by one of ordinary skill in the art. Computer mouse 130, for instance, can include a housing and input buttons with a rotary control ("scroll wheel") configured there between.

A computer peripheral device may be referred to as an "input device," "peripheral input device," "peripheral," or the like. A majority of the embodiments described herein generally involve a computer mouse (e.g., peripheral devices 130), however it should be understood that a computer peripheral device can be any suitable input/output (I/O) device (e.g., user interface device, control device, input unit, or the like) that may be adapted to utilize the novel embodiments described and contemplated herein.

A System for Operating a Computer Peripheral Device

Figure 2:
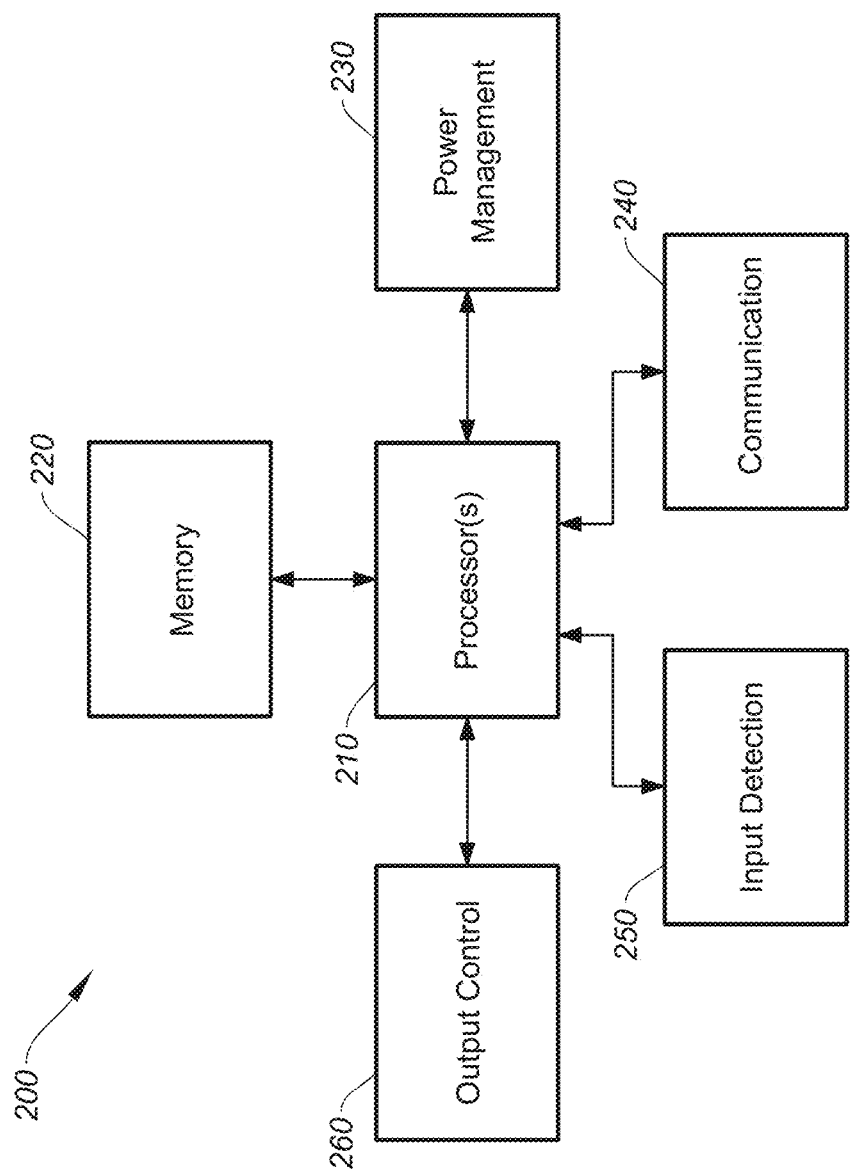
FIG. 2 shows a simplified block diagram of a system to operate an input device, according to certain embodiments.

FIG. 2 shows a system 200 for operating a computer peripheral device 130, according to certain embodiments. System 200 may be configured to operate any of the computer peripheral devices specifically shown or not shown herein but within the wide purview of the present disclosure. System 200 may include processor(s) 210, memory 220, a power management system 230, a communication module 240, an input detection module 250, and an output control module 260. Each of the system blocks 220-260 can be in electronic communication with processor(s) 210 (e.g., via a bus system). System 200 may include additional functional blocks that are not shown or discussed to prevent obfuscation of the novel features described herein. System blocks 220-260 (also referred to as "modules") may be implemented as separate modules, or alternatively, more than one system block may be implemented in a single module.

In certain embodiments, processor(s) 210 may include one or more microprocessors and can be configured to control the operation of system 200. Alternatively or additionally, processor(s) 210 may include one or more microcontrollers (MCUs), digital signal processors (DSPs), or the like, with supporting hardware and/or firmware (e.g., memory, programmable I/Os, etc.), and/or software, as would be appreciated by one of ordinary skill in the art. Processor(s) 210 can control some or all aspects of the operation of computer peripheral device 150 (e.g., system block 220-260). Alternatively or additionally, some of system blocks 220-260 may include an additional dedicated processor, which may work in conjunction with processor(s) 210. For instance, MCUs, DSPs, and the like, may be configured in other system blocks of system 200. Communications block 240 may include a local processor, for instance, to control aspects of communication with host computer 110 (e.g., via Bluetooth, Bluetooth LE, RF, IR, hardwire, ZigBee, Z-Wave, Logitech Unifying, or other communication protocol). Processor(s) 210 may be local to the peripheral device (e.g., contained therein), may be external to the peripheral device (e.g., off-board processing, such as by a corresponding host computing device), or a combination thereof. Processor(s) 210 may perform any of the various functions and methods (e.g., method 600) described and/or covered by this disclosure in conjunction with any other system blocks in system 200. In some implementations, processor 302 of FIG. 3 may work in conjunction with processor 210 to perform some or all of the various methods described throughout this disclosure. In some embodiments, multiple processors may enable increased performance characteristics in system 200 (e.g., speed and bandwidth), however multiple processors are not required, nor necessarily germane to the novelty of the embodiments described herein. One of ordinary skill in the art would understand the many variations, modifications, and alternative embodiments that are possible.

Memory block ("memory") 220 can store one or more software programs to be executed by processors (e.g., in processor(s) 210). It should be understood that "software" can refer to sequences of instructions that, when executed by processing unit(s) (e.g., processors, processing devices, etc.), cause system 200 to perform certain operations of software programs. The instructions can be stored as firmware residing in read-only memory (ROM) and/or applications stored in media storage that can be read into memory for execution by processing devices (e.g., processor(s) 210). Software can be implemented as a single program or a collection of separate programs and can be stored in non-volatile storage and copied in whole or in-part to volatile working memory during program execution. In some embodiments, memory 220 may store data corresponding to inputs on the peripheral device, such as a detected movement of the peripheral device a sensor (e.g., optical sensor, accelerometer, etc.), activation of one or more input elements (e.g., buttons, sliders, touch-sensitive regions, etc.), or the like. Stored data may be aggregated and send via reports to a host computing device.

In certain embodiments, memory array ("memory") 220 can store the various data described throughout this disclosure. For example, memory 220 can store and/or include optical data, performance characteristic data (e.g., DPI data, lift detection threshold data, etc.), and any other type of data germane to the present disclosure. Memory 220 can be used to store any suitable data to perform any function described herein and as would be appreciated by one of ordinary skill in the art with the benefit of this disclosure. Memory array 220 can be referred to as a storage system or a storage subsystem, and can store one or more software programs that can be executed by processors (e.g., in processor(s)

210). It should be understood that "software" can refer to sequences of instructions that, when executed by processing unit(s) (e.g., processors, processing devices, etc.), cause system 200 to perform certain operations of software programs. The instructions can be stored as firmware residing in read only memory (ROM) and/or applications stored in media storage that can be read into memory for processing by processing devices. Software can be implemented as a single program or a collection of separate programs and can be stored in non-volatile storage and copied in whole or in-part to volatile working memory during program execution. From a storage subsystem, processing devices can retrieve program instructions to execute various operations as described herein.

Power management system 230 can be configured to manage power distribution, recharging, power efficiency (e.g., during normal or calibration operations), haptic motor power control, and the like. In some embodiments, power management system 230 can include a battery (not shown), a Universal Serial Bus (USB)-based recharging system for the battery (not shown), and power management devices (e.g., voltage regulators—not shown), and a power grid within system 200 to provide power to each subsystem (e.g., communications block 240, etc.). In certain embodiments, the functions provided by power management system 230 may be incorporated into processor(s) 210. Alternatively, some embodiments may not include a dedicated power management block. For example, functional aspects of power management block 240 may be subsumed by another block (e.g., processor(s) 210) or in combination therewith. The power source can be a replaceable battery, a rechargeable energy storage device (e.g., super capacitor, Lithium Polymer Battery, NiMH, NiCd), or a corded power supply. The recharging system can be an additional cable (specific for the recharging purpose) or it can use a USB connection to recharge the battery.

Communication system 240 can be configured to enable wireless communication with a corresponding host computing device (e.g., 110), or other devices and/or peripherals, according to certain embodiments. Communication system 240 can be configured to provide radio-frequency (RF), Bluetooth®, Logitech proprietary communication protocol (e.g., Unifying, Gaming Light Speed, or others), infra-red (IR), ZigBee®, Z-Wave, or other suitable communication technology to communicate with other computing devices and/or peripheral devices. System 200 may optionally comprise a hardwired connection to the corresponding host computing device. For example, computer peripheral device 130 can be configured to receive a USB, FireWire®, Thunderbolt®, or other universal-type cable to enable bi-directional electronic communication with the corresponding host computing device or other external devices. Some embodiments may utilize different types of cables or connection protocol standards to establish hardwired communication with other entities. In some aspects, communication ports (e.g., USB), power ports, etc., may be considered as part of other blocks described herein (e.g., input detection module 250, output control modules 260, etc.). In some aspects, communication system 240 can send reports generated by the processor(s) 210 (e.g., HID data, streaming or aggregated data, etc.) to a host computing device. In some cases, the reports can be generated by the processor(s) only, in conjunction with the processor(s), or other entity in system 200. Communication system 240 may incorporate one or more antennas, oscillators, etc., and may operate at any suitable frequency band (e.g., 2.4 GHz), etc. One of ordinary skill in the art with the benefit of this disclosure would appreciate the many modifications, variations, and alternative embodiments thereof.

Input detection module 250 can control the detection of a user-interaction with input elements (also referred to as "elements") on an input device. For instance, input detection module 250 can detect user inputs from motion sensors, keys, buttons, roller wheels, scroll wheels, track balls, touch pads (e.g., one and/or two-dimensional touch sensitive touch pads), click wheels, dials, keypads, microphones, GUIs, touch-sensitive GUIs, proximity sensors (e.g., infra-red, thermal, etc.), image sensor based detection such as gesture detection (e.g., via webcam), audio based detection such as voice input (e.g., via microphone), or the like, as would be appreciated by one of ordinary skill in the art with the benefit of this disclosure. Alternatively, the functions of input detection module 250 can be subsumed by processor 210, or in combination therewith.

In some embodiments, input detection module 250 can detect a touch or touch gesture on one or more touch sensitive surfaces on input device 130. Input detection block 250 can include one or more touch sensitive surfaces or touch sensors. Touch sensors generally comprise sensing elements suitable to detect a signal such as direct contact, electromagnetic or electrostatic fields, or a beam of electromagnetic radiation. Touch sensors can typically detect changes in a received signal, the presence of a signal, or the absence of a signal. A touch sensor may include a source for emitting the detected signal, or the signal may be generated by a secondary source. Touch sensors may be configured to detect the presence of an object at a distance from a reference zone or point (e.g., <5 mm), contact with a reference zone or point, or a combination thereof. Certain embodiments of computer peripheral device 150 may or may not utilize touch detection or touch sensing capabilities.

Input detection block 250 can include touch and/or proximity sensing capabilities. Some examples of the types of touch/proximity sensors may include, but are not limited to, resistive sensors (e.g., standard air-gap 4-wire based, based on carbon loaded plastics which have different electrical characteristics depending on the pressure (FSR), interpolated FSR, strain gages, etc.), capacitive sensors (e.g., surface capacitance, self-capacitance, mutual capacitance, etc.), optical sensors (e.g., infrared light barriers matrix, laser based diode coupled with photo-detectors that could measure the time of flight of the light path, etc.), acoustic sensors (e.g., piezo-buzzer coupled with microphones to detect the modification of a wave propagation pattern related to touch points, etc.), inductive sensors, magnetic sensors (e.g., Hall Effect), or the like.

Input detection module 250 may include a movement tracking sub-block that can be configured to detect a relative displacement (movement tracking) of the computer peripheral device 150. For example, input detection module 250 optical sensor(s) such as IR LEDs and an imaging array of photodiodes to detect a movement of computer peripheral device 150 relative to an underlying surface. Computer peripheral device 150 may optionally include movement tracking hardware that utilizes coherent (laser) light. Moving tracking can provide positional data (e.g., delta X and delta Y data from last sampling) or lift detection data. For example, an optical sensor can detect when a user lifts computer peripheral device 130 off of an underlying surface (also referred to as a "work surface" or "underlying work surface") and can send that data to processor 210 for further processing. In some embodiments, processor 210, the movement tracking block (which may include an additional dedicated processor), or a combination thereof, as would be appreciated by one of ordinary skill in the art with the benefit of this disclosure.

In certain embodiments, accelerometers can be used for movement detection. Accelerometers can be electromechanical devices (e.g., micro-electromechanical systems (MEMS) devices) configured to measure acceleration forces (e.g., static and dynamic forces). One or more accelerometers can be used to detect three-dimensional (3D) positioning. For example, 3D tracking can utilize a three-axis accelerometer or two two-axis accelerometers (e.g., in a "3D air mouse," HMD, or other device). Accelerometers can further determine if the input device 150 has been lifted off of an underlying surface and can provide movement data that may include the velocity, physical orientation, and acceleration of computer peripheral device 150. In some embodiments, gyroscope(s) can be used in lieu of or in conjunction with accelerometer(s) to determine movement or input device orientation.

In some embodiments, output control module 260 can control various outputs for a corresponding computer peripheral device. For instance, output control module 260 may control a number of visual output elements (e.g., LEDs, LCD screens), displays, audio outputs (e.g., speakers), haptic output systems, or the like. One of ordinary skill in the art with the benefit of this disclosure would appreciate the many modifications, variations, and alternative embodiments thereof Although certain systems may not be expressly discussed, they should be considered as part of system 200, as would be understood by one of ordinary skill in the art. For example, system 200 may include a bus system to transfer power and/or data to and from the different systems therein. It should be appreciated that system 200 is illustrative and that variations and modifications are possible. System 200 can have other capabilities not specifically described herein. Further, while system 200 is described with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained.

Embodiments of the present invention can be realized in a variety of apparatuses including electronic devices (e.g., computer peripheral devices) implemented using any combination of circuitry and software. Furthermore, aspects and/or portions of system 200 may be combined with or operated by other sub-systems as required by design. For example, input detection module 250 and/or memory 220 may operate within processor(s) 210 instead of functioning as a separate entity. In addition, the inventive concepts described herein can also be applied to any electronic device. Further, system 200 can be applied to any of the computer peripheral devices described in the embodiments herein, whether explicitly, referentially, or tacitly described (e.g., would have been known to be applicable to a particular computer peripheral device by one of ordinary skill in the art). The foregoing embodiments are not intended to be limiting and those of ordinary skill in the art with the benefit of this disclosure would appreciate the myriad applications and possibilities.

System for Operating a Host Computing Device

Figure 3:
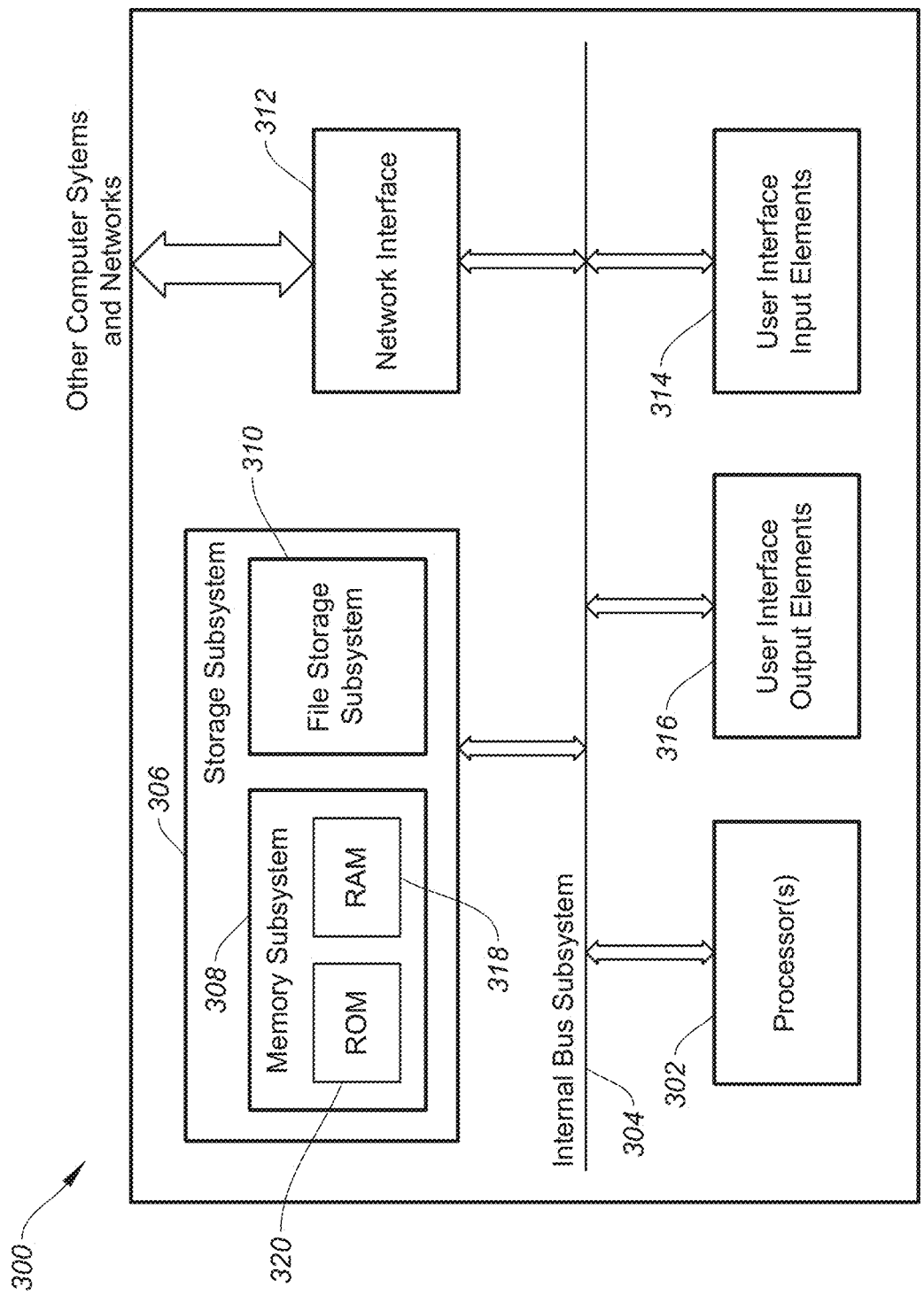
FIG. 3 shows a simplified block diagram of a system to operate a host computing device, according to certain embodiments.

FIG. 3 is a simplified block diagram of a host computing device 300, according to certain embodiments. Host computing device 300 can implement some or all functions, behaviors, and/or capabilities described above that would use electronic storage or processing, as well as other functions, behaviors, or capabilities not expressly described. Host computing device 300 can include a processing subsystem (processor(s)) 302, a storage subsystem 306, user interfaces 314, 316, and a communication interface 312. Computing device 300 can also include other components (not explicitly shown) such as a battery, power controllers, and other components operable to provide various enhanced capabilities. In various embodiments, host computing device 300 can be implemented in any suitable computing device, such as a desktop or laptop computer (e.g., desktop 110), mobile device (e.g., tablet computer, smart phone, mobile phone), wearable device, media device, or the like, or in peripheral devices (e.g., keyboards, etc.) in certain implementations.

Processor(s) 302 can include MCU(s), micro-processors, application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, or electronic units designed to perform a function or combination of methods, functions, etc., described throughout this disclosure.

Storage subsystem 306 can be implemented using a local storage and/or removable storage medium, e.g., using disk, flash memory (e.g., secure digital card, universal serial bus flash drive), or any other non-transitory storage medium, or a combination of media, and can include volatile and/or non-volatile storage media. Local storage can include a memory subsystem 308 including random access memory (RAM) 318 such as dynamic RAM (DRAM), static RAM (SRAM), synchronous dynamic RAM (e.g., DDR), or battery backed up RAM or read-only memory (ROM) 320, or a file storage subsystem 310 that may include one or more code modules. In some embodiments, storage subsystem 306 can store one or more applications and/or operating system programs to be executed by processing subsystem 302, including programs to implement some or all operations described above that would be performed using a computer. For example, storage subsystem 306 can store one or more code modules for implementing one or more method steps described herein (e.g., method 600).

A firmware and/or software implementation may be implemented with modules (e.g., procedures, functions, and so on). A machine-readable medium tangibly embodying instructions may be used in implementing methodologies described herein. Code modules (e.g., instructions stored in memory) may be implemented within a processor or external to the processor. As used herein, the term "memory" refers to a type of long term, short term, volatile, nonvolatile, or other storage medium and is not to be limited to any particular type of memory or number of memories or type of media upon which memory is stored.

Moreover, the term "storage medium" or "storage device" may represent one or more memories for storing data, including read only memory (ROM), RAM, magnetic RAM, core memory, magnetic disk storage mediums, optical storage mediums, flash memory devices and/or other machine-readable mediums for storing information. The term "machine-readable medium" includes, but is not limited to, portable or fixed storage devices, optical storage devices, wireless channels, and/or various other storage mediums capable of storing instruction(s) and/or data.

Furthermore, embodiments may be implemented by hardware, software, scripting languages, firmware, middleware, microcode, hardware description languages, and/or any combination thereof. When implemented in software, firmware, middleware, scripting language, and/or microcode, program code or code segments to perform tasks may be stored in a machine-readable medium such as a storage medium. A code segment (e.g., code module) or machine-executable instruction may represent a procedure, a function, a subprogram, a program, a routine, a subroutine, a module, a software package, a script, a class, or a combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted by suitable means including memory sharing, message passing, token passing, network transmission, etc. These descriptions of software, firmware, storage mediums, etc., apply to systems 200 and 300, as well as any other implementations within the wide purview of the present disclosure. In some embodiments, aspects of the invention (e.g., surface classification) may be performed by software stored in storage subsystem 306, stored in memory 220 of a computer peripheral device, or both. One of ordinary skill in the art with the benefit of this disclosure would appreciate the many modifications, variations, and alternative embodiments thereof.

Implementation of the techniques, blocks, steps and means described throughout the present disclosure may be done in various ways. For example, these techniques, blocks, steps and means may be implemented in hardware, software, or a combination thereof. For a hardware implementation, the processing units may be implemented within one or more ASICs, DSPs, DSPDs, PLDs, FPGAs, processors, controllers, micro-controllers, microprocessors, other electronic units designed to perform the functions described above, and/or a combination thereof Each code module may comprise sets of instructions (codes) embodied on a computer-readable medium that directs a processor of a host computing device 110 to perform corresponding actions. The instructions may be configured to run in sequential order, in parallel (such as under different processing threads), or in a combination thereof. After loading a code module on a general purpose computer system, the general purpose computer is transformed into a special purpose computer system.

Computer programs incorporating various features described herein (e.g., in one or more code modules) may be encoded and stored on various computer readable storage media. Computer readable media encoded with the program code may be packaged with a compatible electronic device, or the program code may be provided separately from electronic devices (e.g., via Internet download or as a separately packaged computer readable storage medium). Storage subsystem 306 can also store information useful for establishing network connections using the communication interface 312.

Computer system 300 may include user interface input devices 314 elements (e.g., touch pad, touch screen, scroll wheel, click wheel, dial, button, switch, keypad, microphone, etc.), as well as user interface output devices 316 (e.g., video screen, indicator lights, speakers, headphone jacks, virtual- or augmented-reality display, etc.), together with supporting electronics (e.g., digital to analog or analog to digital converters, signal processors, etc.). A user can operate input devices of user interface 314 to invoke the functionality of computing device 300 and can view and/or hear output from computing device 300 via output devices of user interface 316.

Processing subsystem 302 can be implemented as one or more processors (e.g., integrated circuits, one or more single core or multi core microprocessors, microcontrollers, central processing unit, graphics processing unit, etc.). In operation, processing subsystem 302 can control the operation of computing device 300. In some embodiments, processing subsystem 302 can execute a variety of programs in response to program code and can maintain multiple concurrently executing programs or processes. At a given time, some or all of a program code to be executed can reside in processing subsystem 302 and/or in storage media, such as storage subsystem 304. Through programming, processing subsystem 302 can provide various functionality for computing device 300. Processing subsystem 302 can also execute other programs to control other functions of computing device 300, including programs that may be stored in storage subsystem 304.

Communication interface (also referred to as network interface) 312 can provide voice and/or data communication capability for computing device 300. In some embodiments, communication interface 312 can include radio frequency (RF) transceiver components for accessing wireless data networks (e.g., Wi-Fi network; 3G, 4G/LTE; etc.), mobile communication technologies, components for short range wireless communication (e.g., using Bluetooth communication standards, NFC, etc.), other components, or combinations of technologies. In some embodiments, communication interface 312 can provide wired connectivity (e.g., universal serial bus (USB), Ethernet, universal asynchronous receiver/transmitter, etc.) in addition to, or in lieu of, a wireless interface. Communication interface 312 can be implemented using a combination of hardware (e.g., driver circuits, antennas, modulators/demodulators, encoders/decoders, and other analog and/or digital signal processing circuits) and software components. In some embodiments, communication interface 312 can support multiple communication channels concurrently.

User interface input devices 314 may include any suitable computer peripheral device (e.g., computer mouse, keyboard, gaming controller, remote control, stylus device, etc.), as would be appreciated by one of ordinary skill in the art with the benefit of this disclosure. User interface output devices 316 can include display devices (e.g., a monitor, television, projection device, etc.), audio devices (e.g., speakers, microphones), haptic devices, etc. Note that user interface input and output devices are shown to be a part of system 300 as an integrated system. In some cases, such as in laptop computers, this may be the case as keyboards and input elements as well as a display and output elements are integrated on the same host computing device. In some cases, the input and output devices may be separate from system 300, as shown in FIG. 1. One of ordinary skill in the art with the benefit of this disclosure would appreciate the many modifications, variations, and alternative embodiments thereof.

It will be appreciated that computing device 300 is illustrative and that variations and modifications are possible. A host computing device can have various functionality not specifically described (e.g., voice communication via cellular telephone networks) and can include components appropriate to such functionality. While the computing device 300 is described with reference to particular blocks, it is to be understood that these blocks are defined for convenience of description and are not intended to imply a particular physical arrangement of component parts. For example, processing subsystem 302, storage subsystem 306, user interfaces 314, 316, and communications interface 312 can be in one device or distributed among multiple devices. Further, the blocks need not correspond to physically distinct components. Blocks can be configured to perform various operations, e.g., by programming a processor or providing appropriate control circuitry, and various blocks might or might not be reconfigurable depending on how an initial configuration is obtained. Embodiments of the present invention can be realized in a variety of apparatus including electronic devices implemented using a combination of circuitry and software. Host computing devices or even peripheral devices described herein can be implemented using system 300.

Various Features for Certain Embodiments of a Computer Peripheral Device

Figures 4A, 4B:
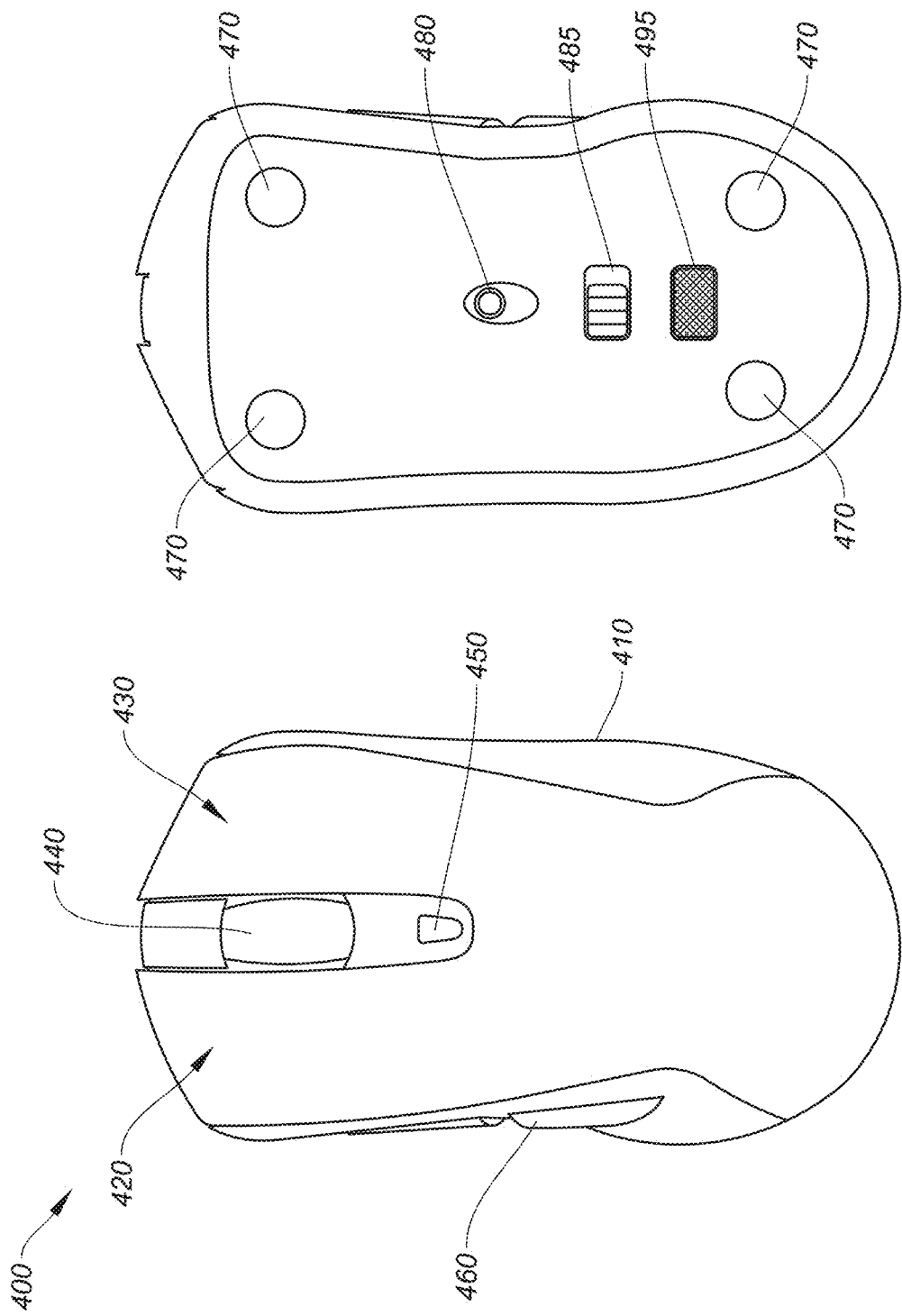
FIG. 4A shows aspects of an input device, according to certain embodiments.
FIG. 4B shows aspects of a bottom portion of the input device, according to certain embodiments.

FIG. 4A shows aspects of a computer peripheral device 400, according to certain embodiments. Computer peripheral device 400 can include housing 410 (e.g., the "shell," "chassis," or "body" of the computer peripheral device), left button 420, right button 430, scroll wheel 440 and buttons 450, 460, as well as any other suitable input elements (e.g., additional buttons, side scroll wheels, touch sensors, etc.) or output elements (e.g., light emitting diodes (LEDs), displays, haptic feedback elements, speakers, etc.), and the like. In some cases, button 450 may be a mode selection button. For example, button 450 may be depressed to manually indicate that the computer peripheral device is being used on a different surface type. For instance, depressing button 450 may cycle through a series of surface types including gaming mouse pad, standard mouse pad, wood surface, metal surface, glass surface, etc., as further described in U.S. patent application Ser. No. 16/913,391, filed on Jun. 26, 2020, which is incorporated by reference into this application in its entirety for all purposes. Alternatively or additionally, other modes of operation are possible with different performance characteristics, as would be understood by one of ordinary skill in the art. Input device 400 may be input device 130 of FIG. 1.

In some embodiments, buttons 450, 460 may be configured to switch communication between host computing devices. For instance, some embodiments may have multi-host connectivity such that computer peripheral device 400 may communication with a first host computer (e.g., a PC laptop) and switch to a second host computer (e.g., a Mac computer) in response to a corresponding button press, as further described in U.S. patent application Ser. No. 14/884,381, which is incorporated by reference into this application in its entirety for all purposes. Alternatively or additionally, switching between hosts may be achieved by, for example, moving a corresponding cursor to an edge of a display in a "flow" enabled system, as further described in U.S. patent application Ser. No. 15/226,770, which is incorporated by reference into this application in its entirety for all purposes. Buttons 450, 460 or any other computer peripheral devices can be configured in any suitable manner and may utilize any suitable function, which can be pre-set or user programmed (e.g., via corresponding driver software on a host computing device), as would be understood by one of ordinary skill in the art.

FIG. 4B shows aspects of a bottom portion of computer peripheral device 400, according to certain embodiments. The bottom of computer peripheral device 400 can include one or more feet 470, an image sensor 480 (e.g., CMOS sensor using an IR LED lamp), and a power switch 485. Additional input elements (e.g., buttons, sliders, etc.) may be included. In some cases, power switch 485 may be located elsewhere on the mouse or may not be included at all (e.g., computer peripheral device 400 may power up/power down based on usage). Button 495 may be a mode selection switch (e.g., switch for selecting a first mode of operation or a second mode of operation), a multi-host computer selection button, or the like. In some embodiments, button 495 may be a communication protocol selection button. For example, pressing button 495 may switch between a proprietary high-frame rate communication protocol or a lower power lower frame rate communication protocol (e.g., Bluetooth® LE). One of ordinary skill in the art with the benefit of this disclosure would understand the many variations, modifications, and alternative embodiments thereof.

In some embodiments, image sensor 480 is typically located near the center of the bottom portion of computer peripheral device 400, as shown. Image sensor 480 can be a single sensor and can operate in one or multiple modes of operation (e.g., surface tracking, changing operating parameters to adapt to particular surface types and corresponding surface classifications, as further described below), lift and/or tilt detection, and the like, according to certain embodiments. An image sensor can be a complementary metal-oxide semiconductor (CMOS) sensor that captures images of the underlying surface and sends each image to a processor (e.g., processor 210, on-board processing on the sensor, etc., to perform image correlation and displacement calculations, etc.) for analysis. Other types of image sensors may be used, including charge-coupled devices (CCD), N-type metal-oxide-semiconductors (NMOS), hybrid devices (e.g., CCD/CMOS), or the like, as would be understood by one of ordinary skill in the art. The processor can detect patterns in the images and see how those patterns have moved since the previous image, and based on changes in the patterns over a sequence of images, the processor can determine how far and what direction the corresponding computer peripheral device has moved, which can be sent to the host computer to control one or more functions (e.g., control a cursor on a display, control an audio volume in a music application, etc.). This process can occur many hundreds if not thousands of times per second to accurately detect movement of all types including a range of movement speeds and accelerations.

Peripheral Device "Cloning" Calibration Process

Despite efforts to standardize manufacturing processes, each computer peripheral device (e.g., computer mouse 130) undergoes an assembly process that often results in a different DPI output between otherwise similar product models even if a user selects (e.g., via a graphical user interface configured to control performance characteristics, such as DPI, for the computer peripheral device) the same target value. This may be due to an opto-mechanical assembly spread in mass production. In production, a computer mouse may be designed to meet DPI target value within +/-10% accuracy, which can be a nominal and acceptable assembly tolerance range in consumer electronics. In other words, a user may set a computer mouse to 1000 DPI, but the actual DPI setting may range between 900 and 1100 and still be within an acceptable tolerance from a manufacturing and quality control standpoint. In some cases, DPI variation may be subject to a surface response and over time could be affected by wear and tear of device feet, which can change the height of the optical sensor relative to an underlying surface. Peripheral devices of the same brand, model, and even assembly plant may have different DPI values, despite all being set to a same DPI value. Thus, users inevitably have to re-adjust and calibrate their aiming and muscle memory to a accommodate a new device. Studies have demonstrated that a seasoned gamer can perceive DPI differences down to 1%, so providing users with the opportunity to avoid up to 20% uncertainty is highly desired.

DPI can be defined as a floating DPI, absolute DPI, and relative DPI. Floating DPI pertains to a DPI value for a computer mouse one might buy off of a store shelf with a roughly defined value, due to the unit assembly spread and line testing capabilities, as described above. Absolute DPI applies after a single mouse calibration where a user runs their computer mouse over a known stroke distance and a sensor axis gets adjusted to match an exact DPI needed to cover that known distance. A relative DPI relates to a computer mouse calibration feature for two computer mice (e.g., cloning), where a user runs the "old" computer mouse in unison with a new mouse and the axis behavior of the old computer mouse gets "cloned" to the new computer mouse. Systems and processes for achieving both the absolute and relative DPI settings are described throughout this disclosure.

In some embodiments, DPI can be calibrated by moving a computer mouse at a known distance and DPI step while the optical sensor records all counts. Counts are integer steps of a given DPI setting. For example, if a computer mouse DPI setting is 400 DPI, a count is worth 25.4/400=0.0635 mm. Sensors can accumulate displacement at a higher internal resolution, but typically only integer counts from a set DPI are reported to the host by the mouse (e.g., change in X and Y data or "delta XY"). Therefore, when the computer mouse DPI is known and the computer mouse is moved over a known distance, an exact number of counts that should be recorded can be calculated. The difference between recorded counts and the theoretical counts can allow the calibration of the XY axis output of the given computer mouse, resulting in a absolute DPI value. Put another way, by comparing an expected theoretical number of counts with the traveled counts from the optical sensor, a true DPI value can be applied for a more accurate DPI calibration. Thus, a true (absolute) DPI target value can be applied and this process can be done regularly at any desired interval to accommodate DPI changes that occur over the life of the product (e.g., due to wear and tear).

Figure 5A:
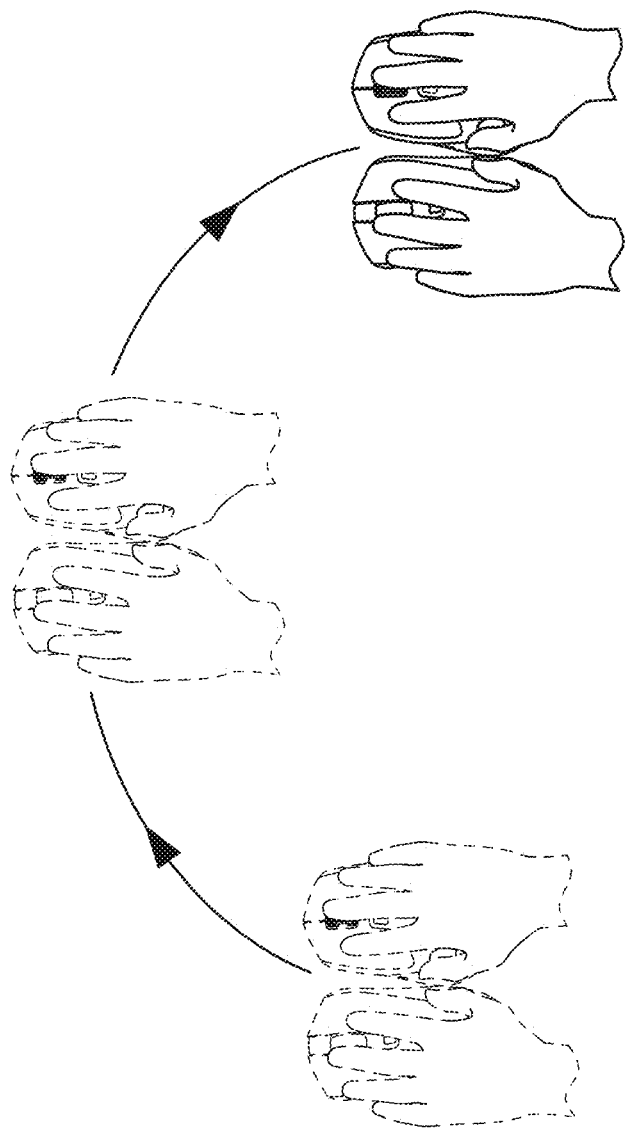
FIG. 5A shows a calibration process to clone performance characteristics of a first input device onto a second input device, according to certain embodiments.

Alternatively, if a user already has a computer mouse that she likes and is accustomed to its particular performance characteristics (e.g., DPI, lift-off threshold, button press dynamics, etc.), the performance characteristics can be "cloned" and applied to a second device, as described throughout this disclosure. To illustrate, in order to clone DPI steps from a first computer mouse to a second computer mouse, both computer mice are typically set to a same DPI setting. One of the computer mice (e.g., the first computer mouse) is selected as a reference device (e.g., the preferred DPI setting) and the other (e.g., the second computer mouse) is selected as the target device for DPI calibration (e.g., to match the DPI characteristic of the preferred first computer mouse). Both computer mice can then be held together and moved in a circular pattern, as shown in FIG. 5A, while recording all counts for both of the computer mice. The counts for both computer mice can be compared and a DPI correction can be applied to the target device (second computer mouse) so that its true DPI value (i.e., an actual DPI value and not a +/- % tolerance range) matches the DPI value of the reference mouse (first computer mouse). In some embodiments, both computer mice may be communicatively coupled to a same host computer device, which manages the data collection (e.g., count values), calculation, and calibration process. In some cases, the computer mice may be coupled to different host computer devices, and the data from each are shared between the host computer devices to perform the calibration process, as would be appreciated by one of ordinary skill in the art with the benefit of this disclosure.

In certain embodiments, instead of the first and second computer mice moving along a same path in unison, the first and second computer mouse can be moved along a same path one at a time consecutively, and the system can track the number of counts for each computer mouse in a sequential fashion, as would be appreciated by one of ordinary skill in the art with the benefit of this disclosure.

In some embodiments, a first movement data and a second movement data are received contemporaneously as the first computer mouse and the second computer mouse are moved in unison along a substantially similar trajectory, as shown in FIG. 5A. In some cases, the first and second movement data can be received directly from the first and second computer mice, respectively (e.g., wireless via Bluetooth), or indirectly, such as from the computer operating system. In any case, the substantially similar trajectory can be exactly the same path along a same line of any suitable thickness (e.g., 1 mm, 1 cm, 1 inch, etc.), or along a parallel trajectory. In the first case, it may be impractical to attempt to expect both mice to travel exactly along a line <1 mm in width as the manual movement of both of the computer mice may not be precise over the entire path. However, if the path is defined as a line of 1 cm or 1 inch width (or other suitable width), it would be more likely that the two mice would traverse along the same path defined by the wider line. Thus, it should be understood that a "substantially" similar trajectory can be a trajectory with preferably a matching path with the understanding that the matching path may not always be 100% on track. Generally, the better the computer mice match each other's movement along a defined path, the more accurate the difference calculation and corresponding calibration accuracy will likely be. In some aspects, a parallel trajectory can mean that the computer mice generally follow a path that is parallel to each other. Referring back to FIG. 5A, if a marker tip was affixed to the sensor element of each computer mouse, and the marker tip traced each of their corresponding paths, it would likely appear to be two similar arcs displaced by a distance (e.g., distance between both sensor elements). The paths would likely look identical or near identical if they were juxtaposed over one another, which can be defined paths having a parallel trajectory. Aspects of the invention can include moving the mice along the same trajectory or along parallel trajectories, as would be appreciated by one of ordinary skill in the art with the benefit of this disclosure.

As noted above, FIG. 5A shows a calibration process to clone performance characteristics (e.g., DPI, lift detection threshold, etc.) of a first input device onto a second input device, according to certain embodiments. Two computer mice are shown being physically held together and following a circular path. It should be understood that any suitable path can be used, provided that both computer mice preferably track each other's movement along that path. For instance, straight paths, arced paths, oval paths, paths with orthographic movement, and any conceivable combination of movement along an underlying surface can be used, however some paths, such as the circular path shown, tend to provide better calibration results than other paths (e.g., straight line path), but not necessarily so. Generally, it may be easier for a user to hold the computer mice together, as shown in FIG. 5A, in order to have both computer mice more accurately follow a particular path together and in a same orientation. However, some embodiments may have the mice physically separate while following the path. In some cases, a jig may be used to secure both mice in a same orientation while moving along a path. One of ordinary skill in the art with the benefit of this disclosure would appreciate the many modifications, variations, and alternative embodiments thereof.

In some embodiments, DPI cloning may apply to a trackball in a computer peripheral device. For example, a trackball may be configured to move a cursor on a graphical user interface based on a rotation of the trackball, which may be different between otherwise similar devices due to manufacturing tolerances, as described above, resulting in a floating DPI. Single trackball calibration can be done by moving the ball a known amount and determining the true count (absolute DPI). Relative DPI can be performed by moving two track balls over a same distance, similar to the way a computer mouse is done, as would be appreciated by one of ordinary skill in the art with the benefit of this disclosure.

Figure 5B:
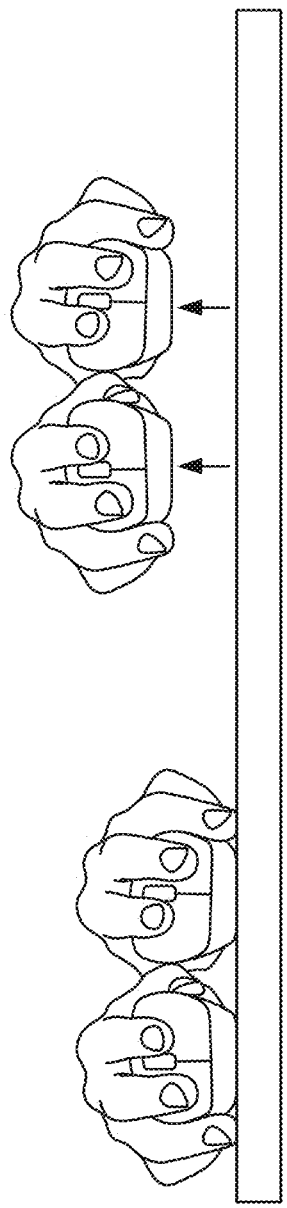
FIG. 5B shows another calibration process to clone performance characteristics of a first input device onto a second input device, according to certain embodiments.

FIG. 5B shows another calibration process to clone performance characteristics of a first input device onto a second input device, according to certain embodiments. In particular, FIG. 5B shows two computer mice lifted in unison off of an underlying surface. The computer mice can be held together and lifted simultaneously, as shown, or they can be lifted separately. Each computer mouse may have a lift detect threshold, which can define a height where a "lift condition" is triggered and can further define a maximum height where x/y tracking data can be considered unusable (e.g., inaccurate).

Figure 6:
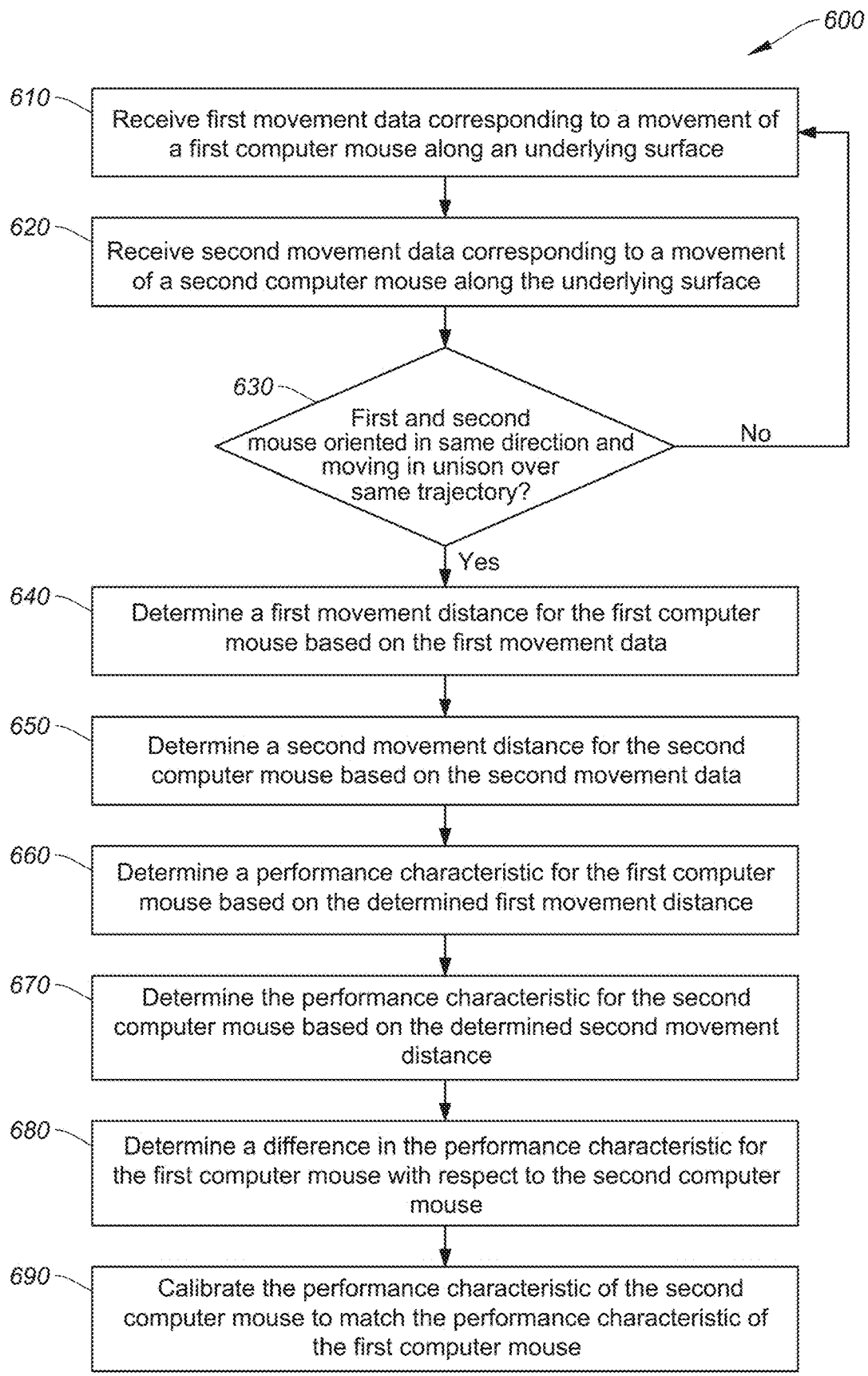
FIG. 6 is a flow chart showing aspects of a method for cloning performance characteristics of a first input device onto a second input device, according to certain embodiments.

FIG. 6 is a simplified flow chart showing aspects of a method 600 for cloning performance characteristics of a first input device onto a second input device, according to certain embodiments. Method 600 can be performed by processing logic that may comprise hardware (circuitry, dedicated logic, etc.), software operating on appropriate hardware (such as a general purpose computing system or a dedicated machine), firmware (embedded software), or any combination thereof. In certain embodiments, method 600 can be performed by aspects of system 300 (processor(s) 302), system 200 (e.g., processors 210), or a combination thereof At operation 610, method 600 can include receiving first movement data corresponding to a movement of a first computer mouse along an underlying surface, according to certain embodiments.

At operation 620, method 600 can include receiving second movement data corresponding to a movement of a second computer mouse along the underlying surface, according to certain embodiments. In some aspects, the first computer mouse and the second computer mouse are in physical contact with each other while they are moved in unison along the substantially similar trajectory. The first movement data can be received from the first computer mouse, and the second movement data may be received from the second computer mouse. In some cases, the first and second movement data may be received from an operating system of a host computer communicatively coupled to the first and second computer mice. The movement of the first and second computer mice may be along a predetermined path, such as an arc or circular path, as shown in FIG. 5A. Other paths may be used provided that both computer mice move similarly along a same path.

At operation 630, method 600 can include determining whether the first and second mouse oriented in same direction and moving in unison over same trajectory, according to certain embodiments. If so, method 600 may continue to operation 640, otherwise method 600 may return to operation 610.

At operation 640, method 600 can include determining a first movement distance for the first computer mouse based on the first movement data, according to certain embodiments.

At operation 650, method 600 can include determining a second movement distance for the second computer mouse based on the second movement data, according to certain embodiments.

At operation 660, method 600 can include determining a performance characteristic for the first computer mouse based on the determined first movement distance, according to certain embodiments. The performance characteristics for the first computer mouse and second computer mouse may be a dots-per-inch (DPI) setting, a lift-off detection threshold, or other suitable performance characteristic that can be cloned such that a second computer peripheral device can be calibrated to match a performance characteristic of the first computer peripheral device.

At operation 670, method 600 can include determining the performance characteristic for the second computer mouse based on the determined second movement distance, according to certain embodiments.

At operation 680, method 600 can include determining a difference in the performance characteristic for the first computer mouse with respect to the second computer mouse, according to certain embodiments.

At operation 690, method 600 can include calibrating the performance characteristic of the second computer mouse to match the performance characteristic of the first computer mouse, according to certain embodiments. Calibrating the performance characteristics can include matching the performance characteristic exactly or within a tolerance. For instance, matching a DPI setting can be with 1% of each other.

It should be appreciated that the specific steps illustrated in FIG. 6 provide a particular method 600 for cloning performance characteristics of a first input device onto a second input device, according to certain embodiments. Other sequences of steps may also be performed according to alternative embodiments. For example, in some cases the substantially similar trajectory of the first computer mouse and the second computer mouse can include lifting the first computer mouse and the second computer mouse off of the underlying surface, and the performance characteristic for the first computer mouse and second computer mouse may be a lift-off detection threshold. In other embodiments, the performance characteristic for the first computer mouse may be a physical position of its corresponding optical sensor, and calibrating the performance characteristic of the second computer mouse to match the performance characteristic of the first computer mouse can include virtualizing a physical optical sensor position and operation of the second computer mouse to virtually match the physical position of the optical sensor of the first computer mouse. Furthermore, additional steps may be added or removed depending on the particular application. Any combination of changes can be used and one of ordinary skill in the art with the benefit of this disclosure would understand the many variations, modifications, and alternative embodiments thereof.

Figure 7:
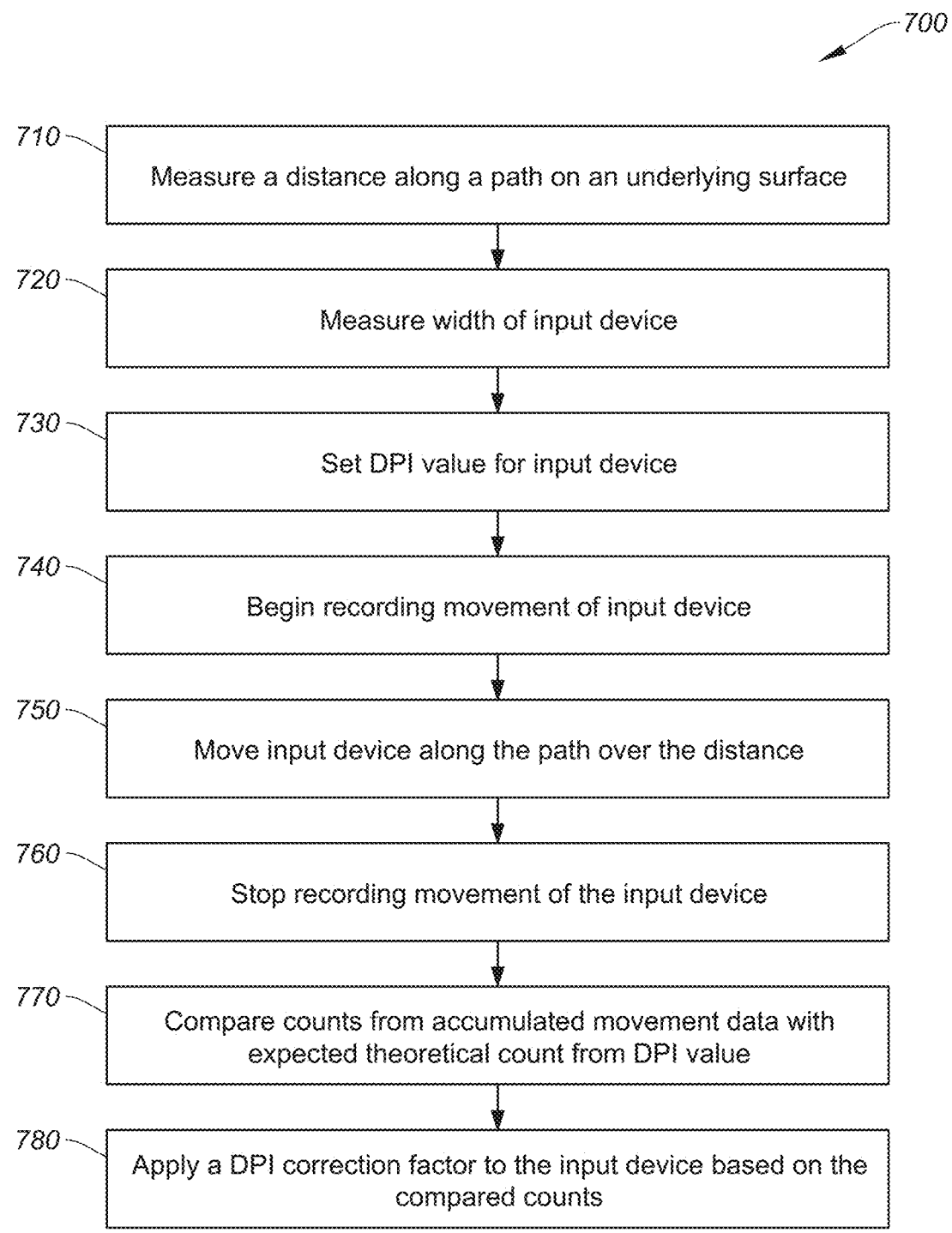
FIG. 7 is a flow chart showing aspects of a method for self-calibrating a performance characteristic of an input device, according to certain embodiments.

FIG. 7 is a simplified flow chart showing aspects of a method 700 for self-calibration of an input device, according to certain embodiments. Method 700 can be performed by processing logic that may comprise hardware (circuitry, dedicated logic, etc.), software operating on appropriate hardware (such as a general-purpose computing system or a dedicated machine), firmware (embedded software), or any combination thereof. In certain embodiments, method 700 can be performed by aspects of system 200 (e.g., processor 210), system 300, or a combination thereof More specifically, a user can perform a self-calibration of an input device (e.g., computer mouse) to achieve an absolute DPI value using the following steps presented in method 700, according to certain embodiments. A user may decide to perform a DPI calibration of her computer mouse and can interface with device software (e.g., a graphical user interface (GUI)) to initiate the process. The GUI tells the user to measure a distance, such as a width or length of their mouse pad from edge-to-edge and input that value into the GUI. At operation 710, the system receives data corresponding to the measured distance along a path (e.g., linear path) on the underlying surface (e.g., along entire width or length of mouse pad), according to certain embodiments.

At operation 720, method 700 can include receiving data corresponding to a width of the input device, according to certain embodiments. In some implementations, a width of the mouse itself may be 60 mm with a centered optical sensor, so 60 mm can be removed from the target displacement stroke (e.g., the movement of the mouse along a path or trajectory). The actual values of the width of the mouse can be estimated, measured manually, determined via information from the product identifier, or any suitable method of acquiring computer mouse width data.

At operation 730, method 700 includes setting a DPI value for the input device (e.g., DPI=400). The GUI can then inform the user to place her mouse edge along one mouse pad edge. At operation 740, method 700 may begin recording the movement of the input device, according to certain embodiments. For example, the GUI can tell the user to press a mouse key to start recording (e.g., left click), and once pressed the MCU can enable a sensor DPI Calibration mode, which resets the optical sensor calibration register and gets ready for a new record. At operation 750, method 700 includes receiving movement data corresponding to a movement of the input device along the path (e.g., linearly along the width of the mouse pad), according to certain embodiments. For example, the GUI can tell the user to move her computer mouse horizontally (or other suitable direction) along a line (e.g., displayed or not displayed) until the computer mouse opposite edge reaches the opposite side mouse pad edge. At operation 760, method 700 can include ending the recording of movement of the input device (e.g., top receiving movement data), according to certain embodiments. For example, the user can press a mouse key (e.g., same key, different key, etc.) to stop recording and the MCU can indicate an end of stroke to the optical sensor, thereby causing the calibration register to stop recording.

At operation 770, method 700 can include reading accumulated XY records (counts), provided that the horizontal stroke had an acceptable vertical deviation (<0.1%). In some embodiments, the MCU may consider only delta X values, so the calibration should be repeated for larger vertical deviations (or vice versa if the movement is along the Y axis with minimal X deviation), as would be appreciated by one of ordinary skill in the art with the benefit of this disclosure. Continuing operation 770, delta X counts can be compared with the theoretical counts from the user provided mouse pad width via the 400 DPI resolution setting at 60 mm, which may provide the DPI error correction factor to be applied to achieve an absolute DPI calibrated mouse (operation 780). In some cases, if the correction exceeds a reasonable assembly/testing spread (+/-10%), then calibration may be aborted and the process should be repeated. In an application of the example above, a user pad width can be 381 mm, a mouse width may be 60 mm, recorded DPI Delta X value may be 5300 counts, an exact DPI accounting 400 DPI recording should be ((381-60)/25.4)*400=5055 counts, therefore the DPI error correction factor may be 5055/5300=0.9538. Other values can be used for the mouse pad or any suitable surface, corresponding length, etc., as would be appreciated by one of ordinary skill in the art with the benefit of this disclosure.

It should be appreciated that the specific steps illustrated in FIG. 7 provide a particular method 700 for self-calibration of an input device, according to certain embodiments. Other sequences of steps may also be performed according to alternative embodiments. Furthermore, additional steps may be added or removed depending on the particular application. Any combination of changes can be used and one of ordinary skill in the art with the benefit of this disclosure would understand the many variations, modifications, and alternative embodiments thereof.

By way of a non-limiting example, a user can perform a cloned DPI calibration of an "old" computer mouse and apply it to a different computer mouse using the following steps, according to certain embodiments: (1) a user decides to perform DPI cloning from a first computer mouse to a second computer mouse and accesses a GUI for beginning the calibration/cloning process; (2) the GUI tells the user to select the "reference" computer mouse to be cloned and the destination computer mouse (or multiple mice) to be calibrated to match the DPI of the reference computer mouse; (3) the GUI tells the user to set both mice at about the same DPI step (e.g., 1000) and place and hold both computer mice side-by-side on a surface (e.g., mouse pad); (4) the GUI tells the user to press a mouse key (e.g., left buttons) to start the cloning process. Once pressed the software starts recording movement/trajectory (e.g., XY data) for both mice. In some embodiments, the GUI requests that the user moves the two mice should be move in an arc, circle, or similar trajectory. If the software detects too much deviation between computer mice (e.g., >1%) and their corresponding recorded paths, the user may be asked to restart the cloning operation to achieve a suitable deviation to get an acceptable copy. In general, a lower deviation results in a better match; (5) the GUI tells the user when enough data is recorded and the user can stop moving the mice; and (6) the software compares the XY recorded trajectory for both mice to calculate a delta ratio. If the delta is within a reasonable typical assembly and testing spread (+/-10%), the cloning can be deemed as valid, thereby achieving a relative DPI cloned computer mouse. Otherwise, the user may opt to redo the cloning operation if the assembly and testing spread is greater than 10%.

In some of the embodiments described above, an input device can be calibrated to achieve a true value performance characteristic (e.g., self-calibrating a DPI setting, as shown in FIG. 7), and an input device can be calibrated to match a performance characteristic of a different input device with a preferred performance characteristic (e.g., cloning a DPI setting, as shown in FIG. 8). In some cases, a user may prefer the performance of a computer mouse that has outdated or subpar settings for certain performance characteristics due to their familiarity and long-term usage of the mouse. In certain embodiments, the system (e.g., processor 210, 302, or a combination thereof) may inform the user that a performance characteristic can be improved. While a DPI setting of 20000 from 1000 may provide a substantial improvement in movement resolution and accuracy, it may require a large learning curve for the user to adapt to the new setting. In such cases, the system may be set to slowly increase a performance characteristic over time (e.g., once per day, per week, etc.) at an interval (e.g., 1000 DPI increase) to acclimate the user in a more adaptable fashion. Any suitable time frame or interval can be used and set automatically or manually, as would be appreciated by one of ordinary skill in the art with the benefit of this disclosure.

Most embodiments utilize at least one network that would be familiar to those skilled in the art for supporting communications using any of a variety of commercially available protocols, such as TCP/IP, UDP, OSI, FTP, UPnP, NFS, CIFS, and the like. The network can be, for example, a local area network, a wide-area network, a virtual private network, the Internet, an intranet, an extranet, a public switched telephone network, an infrared network, a wireless network, and any combination thereof.

In embodiments utilizing a network server as the operation server or the security server, the network server can run any of a variety of server or mid-tier applications, including HTTP servers, FTP servers, CGI servers, data servers, Java servers, and business application servers. The server(s) also may be capable of executing programs or scripts in response to requests from user devices, such as by executing one or more applications that may be implemented as one or more scripts or programs written in any programming language, including but not limited to Java®, C, C# or C++, or any scripting language, such as Perl, Python or TCL, as well as combinations thereof. The server(s) may also include database servers, including without limitation those commercially available from Oracle®, Microsoft®, Sybase®, and IBM®.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a non-transitory computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or browser. It should be appreciated that alternate embodiments may have numerous variations from that described above. F or example, customized hardware might also be used and/or particular elements might be implemented in hardware, software (including portable software, such as applets) or both. Further, connections to other computing devices such as network input/output devices may be employed.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter. The various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art. Indeed, the methods and systems described herein may be embodied in a variety of other forms; furthermore, various omissions, substitutions and changes in the form of the methods and systems described herein may be made without departing from the spirit of the present disclosure. The accompanying claims and their equivalents are intended to cover such forms or modifications as would fall within the scope and spirit of the present disclosure.

Although the present disclosure provides certain example embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general-purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, and/or steps. Thus, such conditional language is not generally intended to imply that features, elements and/or steps are in any way required for one or more examples or that one or more examples necessarily include logic for deciding, with or without author input or prompting, whether these features, elements and/or steps are included or are to be performed in any particular example.

The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Similarly, the use of "based at least in part on" is meant to be open and inclusive, in that a process, step, calculation, or other action "based at least in part on" one or more recited conditions or values may, in practice, be based on additional conditions or values beyond those recited. Headings, lists, and numbering included herein are for ease of explanation only and are not meant to be limiting.

The various features and processes described above may be used independently of one another, or may be combined in various ways. All possible combinations and sub-combinations are intended to fall within the scope of the present disclosure. In addition, certain method or process blocks may be omitted in some embodiments. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed examples. Similarly, the example systems and components described herein may be configured differently than described. For example, elements may be added to, removed from, or rearranged compared to the disclosed examples.

What is claimed is:

1. A computer-implemented method comprising:
   receiving first movement data corresponding to a movement of a first computer mouse along an underlying surface;
   receiving second movement data corresponding to a movement of a second computer mouse along the underlying surface,
      wherein the first computer mouse and the second computer mouse are oriented in a same direction and moving in unison over a substantially similar trajectory, and
      wherein the first movement data and the second movement data is received contemporaneously as the first computer mouse and the second computer mouse are moved in unison along the substantially similar trajectory;
   determining a first movement distance for the first computer mouse based on the first movement data;
   determining a second movement distance for the second computer mouse based on the second movement data;
   determining a performance characteristic for the first computer mouse based on the determined first movement distance;
   determining the performance characteristic for the second computer mouse based on the determined second movement distance;
   determining a difference in the performance characteristic for the first computer mouse with respect to the second computer mouse; and
   calibrating the performance characteristic of the second computer mouse to match the performance characteristic of the first computer mouse.

2. The computer-implemented method of claim 1 wherein the first computer mouse and the second computer mouse are in physical contact with each other while they are moved in unison along the substantially similar trajectory.

3. The computer-implemented method of claim 1 wherein the performance characteristics for the first computer mouse and second computer mouse is a dots-per-inch (DPI) setting.

4. The computer-implemented method of claim 3 wherein the DPI setting in the second computer mouse is matched to the DPI setting in the first computer mouse to within 1%.

5. The computer-implemented method of claim 1 wherein the first movement data is received from the first computer mouse, and wherein the second movement data is received from the second computer mouse.

6. The computer-implemented method of claim 1 wherein the first movement data and the second movement data are received from an operating system of a host computing device communicatively coupled to the first computer mouse and the second computer mouse.

7. The computer-implemented method of claim 1 wherein the substantially similar trajectory of the first computer mouse and the second computer mouse includes lifting the first computer mouse and the second computer mouse off of the underlying surface, and
   wherein the performance characteristic for the first computer mouse and second computer mouse is a lift-off detection threshold.

8. The computer-implemented method of claim 1 wherein the performance characteristic for the first computer mouse is a physical position of its corresponding optical sensor, and
   wherein calibrating the performance characteristic of the second computer mouse to match the performance characteristic of the first computer mouse includes virtualizing a physical optical sensor position and operation of the second computer mouse to virtually match the physical position of the optical sensor of the first computer mouse.

9. A system comprising:
   one or more processors;
   one or more machine-readable, non-transitory storage mediums that include instructions configured to cause the one or more processors to perform operations including:
   receiving first movement data corresponding to a movement of a first computer mouse along an underlying surface;
   receiving second movement data corresponding to a movement of a second computer mouse along the underlying surface,
      wherein the first computer mouse and the second computer mouse are oriented in a same direction and moving in unison over a substantially similar trajectory, and wherein the first movement data and the second movement data is received contemporaneously as the first computer mouse and the second computer mouse are moved in unison along the substantially similar trajectory;

determining a first movement distance for the first computer mouse based on the first movement data;

determining a second movement distance for the second computer mouse based on the second movement data;

determining a performance characteristic for the first computer mouse based on the determined first movement distance;

determining the performance characteristic for the second computer mouse based on the determined second movement distance;

determining a difference in the performance characteristic for the first computer mouse with respect to the second computer mouse; and calibrating the performance characteristic of the second computer mouse to match the performance characteristic of the first computer mouse.

10. The system of claim 9 wherein the first computer mouse and the second computer mouse are in physical contact with each other while they are moved in unison along the substantially similar trajectory.

11. The system of claim 9 wherein the performance characteristics for the first computer mouse and second computer mouse is a dots-per-inch (DPI) setting.

12. The system of claim 11 wherein the DPI setting in the second computer mouse is matched to the DPI setting in the first computer mouse to within 1%.

13. The system of claim 9 wherein the first movement data is received from the first computer mouse, and wherein the second movement data is received from the second computer mouse.

14. The system of claim 9 wherein the performance characteristic for the first computer mouse is a physical position of its corresponding optical sensor, and wherein calibrating the performance characteristic of the second computer mouse to match the performance characteristic of the first computer mouse includes virtualizing a physical optical sensor position and operation of the second computer mouse to virtually match the physical position of the optical sensor of the first computer mouse.

15. A non-transitory computer-readable storage medium having data stored therein representing software executable by one or more processors, the software including instructions operable to cause the one or more processors to perform operations including:

receiving first movement data corresponding to a movement of a first computer mouse along an underlying surface;

receiving second movement data corresponding to a movement of a second computer mouse along the underlying surface, wherein the first computer mouse and the second computer mouse are oriented in a same direction and moving in unison over a substantially similar trajectory, and wherein the first movement data and the second movement data is received contemporaneously as the first computer mouse and the second computer mouse are moved in unison along the substantially similar trajectory;

determining a first movement distance for the first computer mouse based on the first movement data;

determining a second movement distance for the second computer mouse based on the second movement data;

determining a performance characteristic for the first computer mouse based on the determined first movement distance;

determining the performance characteristic for the second computer mouse based on the determined second movement distance;

determining a difference in the performance characteristic for the first computer mouse with respect to the second computer mouse; and calibrating the performance characteristic of the second computer mouse to match the performance characteristic of the first computer mouse.

16. The non-transitory computer-readable storage medium of claim 15 wherein the first computer mouse and the second computer mouse are in physical contact with each other while they are moved in unison along the substantially similar trajectory.

17. The non-transitory computer-readable storage medium of claim 15 wherein the performance characteristics for the first computer mouse and second computer mouse is a dots-per-inch (DPI) setting.

18. The non-transitory computer-readable storage medium of claim 17 wherein the DPI setting in the second computer mouse is matched to the DPI setting in the first computer mouse to within 1%.

19. The non-transitory computer-readable storage medium of claim 15 wherein the first movement data is received from the first computer mouse, and wherein the second movement data is received from the second computer mouse.

20. The non-transitory computer-readable storage medium of claim 15 wherein the performance characteristic for the first computer mouse is a physical position of its corresponding optical sensor, and wherein calibrating the performance characteristic of the second computer mouse to match the performance characteristic of the first computer mouse includes virtualizing a physical optical sensor position and operation of the second computer mouse to virtually match the physical position of the optical sensor of the first computer mouse.

\* \* \* \* \*